UNITED STATES PATENT OFFICE.

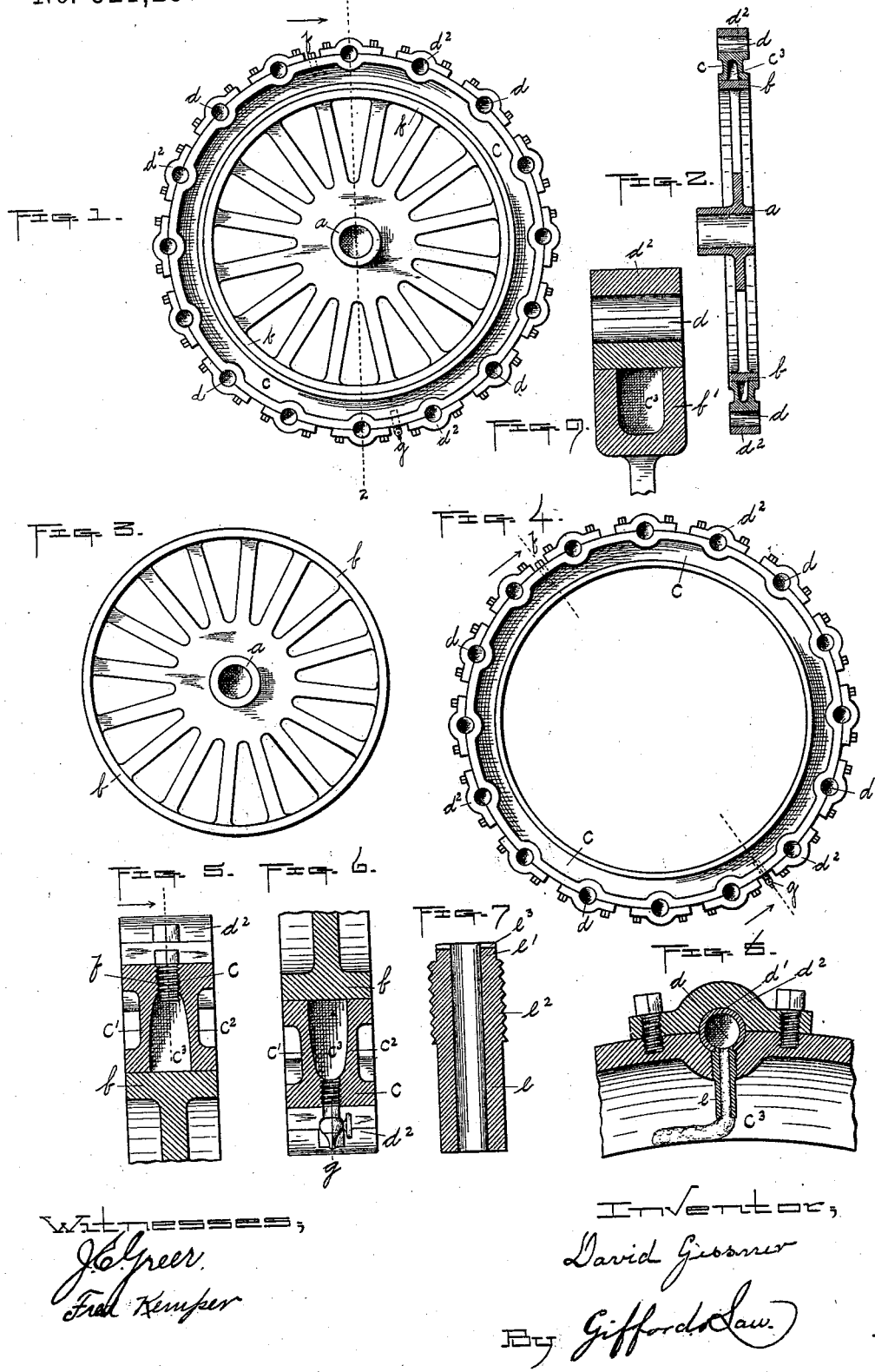

DAVID GESSNER, OF WORCESTER, MASSACHUSETTS.

MECHANISM FOR OILING BEARINGS.

SPECIFICATION forming part of Letters Patent No. 521,235, dated June 12, 1894.

Application filed March 18, 1891. Serial No. 385,443. (No model.)

*To all whom it may concern:*

Be it known that I, DAVID GESSNER, of Worcester, in the State of Massachusetts, have invented a new and useful Improvement in Mechanism for Oiling the Bearings of Rollers Mounted upon Revolving Spiders or Wheels, of which the following is a specification.

In the drawings, Figure 1 is an end view of one of the spiders or wheels for carrying the rollers. Fig. 2 is a vertical section through the line 2, 2 of Fig. 1. Fig. 3 is an end view of the central portion of Fig. 1 detached. Fig. 4 is an end view of the circumferential portion of Fig. 1 detached. Figs. 5, 6, 7 and 8 are details. Fig. 9 is a detail showing how the oil chamber may be located in the wheel instead of in the tire.

The central portion shown in Fig. 3 is cast in a separate piece from the circumferential portion and consists of a hub $a$ to receive the main shaft connected by spokes or other suitable means with a rim $b$.

The circumferential portion shown in Fig. 4 which is to occupy the position of a tire on the part of Fig. 3, consists of a hollow tire $c$ cast in one piece composed of the two sides $c'$ and $c^2$ with the opening $c^3$ between them. This opening is unclosed toward the center until the parts of Figs. 3 and 4 are combined, so that in the construction of the apparatus, after the tire $c$ is cast and before it is combined with the part of Fig. 3, the opening $c^3$ may be entirely cleansed of all substances, such as sand, &c., which would tend to interfere with the lubricating effect of the oil.

The bearings of the rollers are located upon the periphery of the tire $c$ at $d\ d$, &c., and from each bearing a hole is drilled toward the center into the common chamber $c^3$. These holes are screw threaded so as to receive the wick tubes $e$, one of which is shown detached in Fig. 7. These tubes are so constructed that the body of the tube at $e'$ projects slightly beyond the screw threaded portion $e^2$, so that when the screw threaded portion is engaged with the screw thread in the drilled hole already referred to, the projecting portion $e'$ will extend through the bushing $d'$ of the roller bearing and thus hold the bushing securely in position. The several tubes $e$ extend, as shown in Fig. 5, inward into the common chamber $c^3$ toward the center, so as to receive the oil from that portion of the common chamber $c^3$ which is nearest the center.

$d^2$ are the caps for securing the roller journals in position in their bearings. I prefer to provide the wick tubes shown in Fig. 7, with a slot at $e^3$ for inserting a screw driver to set the tube in its final position.

At $f$ a hole is drilled through the outer wall of the chamber $c^3$ in which is fitted a plug, and about diametrically opposite, another hole $g$ is drilled into which is fitted a cock. By opening this cock and removing this plug the oil may be drawn off at any time, and by closing this cock and removing the plug the chamber $c^3$ may be filled. The inner surfaces of the parts $c'\ c^2$ on opposite sides of the chamber $c^3$ are turned off so as to fit accurately the rim $b$, which is also turned off on its periphery for the same purpose; and after the two parts, shown respectively in Figs. 3 and 4, are constructed, the circumferential portion of Fig. 4 is driven on to the central portion of Fig. 3 so that the two are combined as shown in Fig. 1 and the portion $c$ constitutes in substance a tire for the wheel or central portion of Fig. 3.

I do not limit myself to locating the side walls of the oil chamber in the tire casting since I am aware that they may be made in piece with the wheel casting as shown in Fig. 9 or partly in both. The rim in Fig. 9 is designated by $b'$.

I claim—

1. In combination with a wheel or disk, a hollow tire, bearings on the periphery of the tire and passages connecting the several bearings with the hollow within the tire, substantially as described.

2. In combination with a wheel or disk, a tire containing an open recess and adapted to be closed by a part of the wheel, bearings on the periphery of the tire and passages connecting the several bearings with the said recess, substantially as described.

3. A wheel or disk provided at its periphery with a circumferentially extending oil chamber in combination with bearings located at the periphery, said chamber being in communication with said bearings, whereby oil may be supplied from said chamber to the bearings, substantially as described.

4. In combination with a wheel or disk, a tire having bearings, the wheel or disk and the tire being formed one with a circumferentially extending channel and the other constituting one wall to said channel, whereby when said parts are brought together an oil chamber is formed for the supply of oil to said bearings, substantially as described.

5. A wheel or disk having at its periphery a series of bearings and within said bearings but also at its periphery an oil chamber, in combination with a series of wick tubes whereby said bearings are connected with said oil chamber, substantially as described.

DAVID GESSNER.

Witnesses:
   HENRY L. PARKER,
   WILLIAM E. FOWLER.